United States Patent Office 3,834,887
Patented Sept. 10, 1974

3,834,887
STUNTING PLANTS EMPLOYING 4-OXO-α-PHENYL-2,5 - CYCLOHEXADIENE-Δ¹,ᵅ-ACETONITRILE, O-(ALKYLCARBAMYL)OXIMES
William D. Dixon, Kirkwood, Mo., assignor to Monsanto Company, St. Louis, Mo.
No Drawing. Original application Nov. 24, 1971, Ser. No. 201,958, now abandoned. Divided and this application Sept. 24, 1973, Ser. No. 400,110
Int. Cl. A01n 9/20
U.S. Cl. 71—76
5 Claims

ABSTRACT OF THE DISCLOSURE

Certain 4 - oxo - α-phenyl-2,5-cyclohexadiene-Δ¹,ᵅ-acetonitrile, O-(alkylcarbamoyl)oximes are preperad by reacting a phenylcyanomethylene quinone oxime with either an alkyl isocyanate or a dialkyl carbamoyl chloride.

---

This is a division of application Ser. No. 201,958, filed Nov. 24, 1971, now abandoned.

This invention relates to a new class of chemical compounds which are useful for application to plant life. Such compounds have both herbicidal (plant killing) properties and plant regulant properties in which they serve to modify the normal sequential development of treated plants to argricultural maturity. The compounds also serve as inhibitors of enzymatic activity in certain insect pests.

The novel compounds of this invention are 4-oxo-α-phenyl - 2,5-cyclohexadiene-Δ¹,ᵅ-acetonitrile, O-(alkylcarbamoyl)oximes, and they may be illustrated by the formula

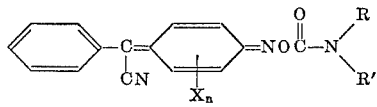

wherein R represents hydrogen or alkyl of from 1 to 3 carbon atoms, R' represents alkyl of from 1 to 3 carbon atoms, $n$ is an integer from zero to 2, and each X independently represents chlorine, bromine, alkyl of from 1 to 3 carbon atoms or methoxy.

These novel compounds can be prepared by reacting the corresponding phenylcyanomethylene quinone oxime with an alkyl isocyanate where R is hydrogen. However, when both R and R' are alkyl, a dialkyl carbamoyl chloride is used instead of the isocyanate. The starting oxime is generally dissolved in an inert organic solvent such as an aliphatic or aromatic hydrocarbon, an ester, an ether, or other organic such as tetrahydrofuran, etc. The isocyanate or carbamoyl chloride is then added, and a small amount of an amine catalyst such as trialkyl amines or pyridine is preferably also added. Where a carbamoyl chloride is a starting material, said amine can also serve as an HCl acceptor during the reaction.

The novel compounds of this invention are quite readily obtained when the reaction is conducted at room temperature, although slightly elevated temperatures may be employed if desired. The phenylcyanomethylene quinone oxime starting materials are known compounds, and a method of preparing such starting oximes is described in U.S. Pat. 3,156,704.

The following illustrative, non-limiting examples will serve to demonstrate to those skilled in the art the manner in which specific compounds of this invention can be prepared.

EXAMPLE 1

A suitable reaction vessel is charged with a solution of 2.5 grams (0.01 mole) of 3-methoxy-4-oxo-α-phenyl-2,5-cyclohexadiene-Δ¹,ᵅ-acetonitrile oxime in about 150 ml. of tetrayhdrofuran. This solution is stirred during the addition of 0.57 grams (0.01 mole) of methyl isocyanate and a drop of triethylamine, after which stirring is continued overnight. A clear solution is obtained, and the solvent is removed under vacuum. The residue is then recrystallized from acetonitrile to yield 1.8 grams of 3-methoxy-4-oxo-α - phenyl-2,5-cyclohexadiene-Δ¹,ᵅ-acetonitrile, O-(methylcarbamoyl)oxime as an orange solid, m.p. 150–153° C. Elemental analysis shows 66.06% carbon, 4.82% hydrogen and 13.68% nitrogen as against calculated values of 66.01%, 4.89% and 13.59%, respectively.

EXAMPLE 2

A suitable reaction vessel is charged with a suspension of 5.0 grams (0.02 mole) of 2,5-dimethyl-4-oxo-α-phenyl-2,5-cyclohexadiene-Δ¹,ᵅ-acetonitrile oxime in about 150 ml. of ether. While stirring, there is added 1.2 grams (0.02 mole) of methyl isocyanate and two drops of triethylamine, and the stirring is continued for 12 hours. A solid which froms is removed by filtration and recrystallized from ethyl acetate. The product, although believed to contain some isomers, is 2.6 grams of 2,5-dimethyl-4-oxo - α - phenyl - 2,5-cyclohexadiene-Δ¹,ᵅ-acetonitrile, O-(methylcarbamoyl)oxime, a yellow solid, m.p. 125–128° C. (dec.). Elemental analysis shows 70.17% carbon, 5.45% hydrogen and 13.58% nitrogen as against calculated values of 70.34%, 5.58% and 13.67%, respectively.

EXAMPLE 3

Following the procedure described in detail in Example 1, an equimolar amount of propyl isocyanate is substituted for the methyl isocyanate to yield 3-methoxy-4-oxo-α-phenyl-2,5-cyclohexadiene-Δ¹,ᵅ-acetonitrile, O-(propylcarbamoyl)oxime.

EXAMPLE 4

Following the procedure described in Example 1, an equimolar amount of 2-bromo-4-oxo-α-phenyl-2,5-cyclohexadiene-Δ¹,ᵅ-acetonitrile oxime is employed in place of the oxime there recited to yield 2-bromo-4-oxo-α-phenyl-2,5 - cyclohexadiene - Δ¹,ᵅ-acetonitrile, O-(methylcarbamoyl)oxime.

EXAMPLE 5

A suitable reaction vessel is charged with a solution of 5.7 grams (0.02 mole) of 2-chloro-3-methyl-4-oxo-α-phenyl-2,5-cyclohexadiene-Δ¹,ᵅ-acetonitrile oxime in about 300 ml. of ether. This solution is stirred during the addition of 0.57 grams (0.01 mole) of methyl isocyanate, after which stirring is continued for 4 hours. The solid which forms is removed by filtration. It is then recrystallized from acetonitrile to yield 3.0 grams of 2-chloro-3-methyl-4 - oxo - α-phenyl-2,5-cyclohexadiene-Δ¹,ᵅ-acetonitrile, O-(methylcarbamoyl)oxime as a yellow solid, m.p. 136–140° C. (dec.). Elemental analysis shows 61.98% carbon, 4.17% hydrogen, 10.72% chlorine and 12.99% nitrogen as against calculated values of 62.29%, 4.31%, 10.82% and 12.82%, respectively.

EXAMPLE 6

A suitable reaction vessel is charged with a solution of 5.7 grams (0.02 mole) of 2-chloro-5-methyl-4-oxo-α-phenyl-2,5-cyclohexadiene-Δ¹,ᵅ-acetonitrile oxime in tetrahydro furan. This solution is stirred during the addition of 1.2 grams (0.02 mole) of methyl isocyanate and two drops of triethylamine, after which stirring is continued for 3 hours. The solvent is removed under vacuum. The residue is then recrystallized twice from ethyl acetate to yield 1.6 grams of 2-chloro-5-methyl-4-oxo-α-phenyl-2,5-cyclohexadiene-Δ¹,ᵅ-acetonitrile, O-(methylcarbamoyl)oxime as a yellow solid, m.p. 115–119° C. (dec.). Elemental analysis shows 61.43% carbon, 4.11% hydrogen, 10.65% chlorine and 12.70% nitrogen as against calculated values of 62.29%, 4.31%, 10.82% and 12.82%, respectively.

EXAMPLE 7

Following the procedure described in detail in Example 6, an equimolar amount of 3-ethyl-4-oxo-α-phenyl-2,5-cyclohexadiene-$\Delta^{1,\alpha}$-acetonitrile oxime is substituted for the oxime there recited to yield 3-ethyl-4-oxo-α-phenyl-2,5-cyclohexadiene-$\Delta^{1,\alpha}$-acetonitrile, O-(methylcarbamoyl)oxime.

EXAMPLE 8

A suitable reaction vessel is charged with a solution of 11.1 grams (0.05 mole) of phenylcyanomethylene quinone oxime in 150 ml. of tetrahydrofuran, 5.3 grams (0.05 mole) of dimethyl carbamoyl chloride and 5.1 grams (0.05 mole) of triethylamine. The reaction mixture is then stirred for 72 hours, after which the solvent is removed under vacuum. The residue is treated with 50 ml. of water to remove the amine-hydrochloride, and then fractionally recrystallized three times from acetonitrile. There is obtained 2.0 grams of 4-oxo-α-phenyl-2,5-cyclohexadiene-$\Delta^{1,\alpha}$-acetonitrile, O-(dimethylcarbamoyl)oxime as a yellow solid, m.p. 164–166° C. Elemental analysis shows 69.50% carbon and 5.27% hydrogen as against calculated values of 69.61% and 5.15%, respectively.

EXAMPLE 9

A suitable reaction vessel is charged with a solution of 5.1 grams (0.02 mole) of 3-chloro-4-oxo-α-phenyl-2,5-cyclohexadiene-$\Delta^{1,\alpha}$-acetonitrile oxime in about 100 ml. of tetrahydrofuran. This solution is stirred during the addition of 1.2 grams (0.02 mole) of methyl isocyanate and a drop of triethylamine, after which stirring is continued for 24 hours. The solvent is removed under vacuum, and the residue is recrystallized first from acetonitrile and then from ethyl acetate. There is obtained 1.4 grams of 3-chloro-4-oxo-α-phenyl - 2,5 - cyclohexadiene-$\Delta^{1,\alpha}$-acetonitrile, O-(methylcarbamoyl)oxime as a tan solid, m.p. 168–171° C. (dec.). Elemental analysis shows 61.58% carbon, 3.97% hydrogen and 11.43% chlorine as against calculated values of 61.25%, 3.86% and 11.30%.

EXAMPLE 10

A suitable reaction vessel is charged with a solution of 4.7 grams (0.02 mole) of 3-methyl-4-oxo-α-phenyl-2,5-cyclohexadiene-$\Delta^{1,\alpha}$-acetonitrile oxime in about 150 ml. of ether. While stirring, there is added 1.1 grams (0.02 mole) of methyl isocyanate and a drop of triethylamine, and the stirring is continued for 4 hours. A solid which forms is removed by filtration and recrystallized from ethyl acetate. The product, although believed to contain some isomers, is 4.0 grams of 3-methyl-4-oxo-α-phenyl-2,5-cyclohexadiene-$\Delta^{1,\alpha}$-acetonitrile, O-(methylcarbamoyl)oxime, a yellow solid, m.p. 135–137° C. (dec.). Elemental analysis shows 69.51% carbon, 5.06% hydrogen and 14.33% nitrogen as against calculated values of 69.61%, 5.15% and 14.23%, respectively.

In using compounds of this invention as plant regulants, it will be understood that such utility serves to modify the normal sequential development of a treated plant to agricultural maturity. Such modification may result from the effect of the material on the physiological processes of the plant or from the effect of said material on the morphology of the plant. It should additionally be recognized that modifications may also result from a combination or sequence of both physiological and morphological factors.

Modifying effects of a plant regulant are probably most readily observed as changes in the size, shape, color or texture of the treated plant or any of its parts. Similarly, changes in the quantity of the plant fruit or flowers are also quite apparent from simple, visual inspection. The above changes may be characterized as an acceleration or retardation of vegetative growth, stunting, dwarfing, leaf or canopy alteration, increased branching, tillering, chlorosis, albinism, terminal inhibition, increased flowering or fruit set and the like.

Modifications in the normal sequential development of a treated plant to agricultural maturity can also be manifested by increased root growth, stool or sprout inhibition, delayed budding, increased carbohydrate deposition or protein content, defoliation, dessication, reduced transpiration, delayed senescence, prolonged dormancy, increased cold hardiness, delayed or accelerated ripening, thinning of fruit, prevention of pre-harvest fruit drop, loosening of fruit, etc.

Although many of the above modifications are per se desirable, it is most often the ultimate effect of such modifications on the economic factor that is of primary significance. For example, reducing the physical size of each plant in a field permits the growing of more plants per unit area and leads to increased yields. Or, loosening of fruit at the proper time permits simplified, mechanized harvesting or the expenditure of less time for manual picking. Further, a reduction in the maturation rate on portions of a crop permits an extended harvest period at peak yield and more efficient use of subsequent crop processing equipment.

It is to be understood that the regulation of plants in accordance with the instant invention does not include the total inhibition or the killing of such plants. Although phytotoxic amounts of materials disclosed herein can be employed to exert a herbicidal (killing) action as hereinafter described, the utilization of plant regulating amounts of such materials will serve to modify the normal sequential development of the treated plant to agricultural maturity. As may be expected, and as apparent to those skilled in the art, such plant regulating amounts will vary, not only with the material selected, but also with the modifying effect desired, the specie of plant and its stage of development, the plant growth medium and whether a permanent or transitory effect is sought.

As shown by the exemplary tests which follow, plant regulant activity is particularly demonstrated by those compounds of this invention which have the formula

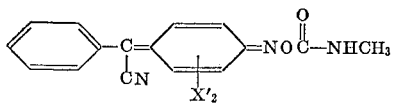

wherein each X' is either chlorine or methyl.

EXAMPLE A

A number of corn plants of the Pioneer 3567 variety are grown from seeds in an aluminum pan for a period of one week. The height of each corn plant is then measured to the top of the whorl. A 1% solution of each of the compounds of Examples 5 and 6 in acetone is prepared, and a 2.0 ml. portion of each solution is mixed with 0.8 ml. of acetone and 2.8 ml. of a water mixture with 0.05% of Aerosol OT. Each of resultant solutions is then sprayed over the plants in a pan at an application rate equivalent to about 6.0 lbs./acre. A control pan, planted at the same time as the test pans, also has its plants measured, but receives no chemical application. The pans are transferred to a greenhouse and watered from below in a sand bench. Each pan is fertilized with 40 ml. of a 1.5% solution of Rapid-Gro about 2 days after treatment.

Two weeks after treatment the height of each plant in the pans is again measured to the top of the whorl. After determining the average height increase of the plants in the untreated control pan, it is found that at least two-thirds of the corn plants treated with each of the test compounds of this invention show 26% or more stature reduction by direct comparison.

EXAMPLE B

A number of rice plants of the Bluebell variety are grown from seeds in an aluminum pan for a period of one week. The height of each rice plant is then measured to the top of the whorl. A solution of the compound of Example 5 is prepared and applied to the rice plants in the manner described in Example A. An untreated control pan is also prepared, and both pans are thereafter handled as described in said Example A.

Two weeks after treatment the height of each plant in the pans is again measured to the top of the whorl. After determining the average height increase of the plants in the untreated control pan, it is found that at least two-thirds of the rice plants treated with the test compound of this invention show 26% or more stature reduction by direct comparison.

EXAMPLE C

A number of wheat plants of the Waldron variety are grown from seeds in aluminum pans for a period of one week. The height of each wheat plant is then measured to the top of the whorl. Solutions of each of the compounds of Examples 2 and 6 are prepared, and each is applied to a pan of wheat plants in the manner described in Example A. An untreated control pan is also prepared, and all pans are thereafter handled as described in said Example A.

Two weeks after treatment the height of each plant in the pans is again measured to the top of the whorl. After determining the average height increase of the plants in the untreated control pan, it is found that at least two-thirds of the wheat plants treated with each of the test compounds of this invention show 26% or more stature reduction by direct comparison.

In connection with the specific application rates recited in Examples A–C in terms of lbs./acre, it should be pointed out that these tests involve treatment of a relatively small number of plants in a 52 in.$^2$ pan. Thus, the actual rate of application of the chemical to the plants themselves is generally somewhat lower than the stated lbs./acre.

The growth inhibition or stature reduction demonstrated herein by these compounds of this invention is a valuable feature in plant regulation. Such reduction of stature can render a planted field more readily accessible to personnel or machinery which are needed for various pesticide applications, for cultivation during the growth cycle, and for ultimate harvesting. It has been found that reducing the stature of certain plants correspondingly reduces the incidence of pest infestation. At the same time, such plants may demonstrate increased resistance to drought and/or increased cold hardness. Further, crop plants of reduced stature permit an increase in the plant population of a given growing area and will often lead to significant yield increases as illustrated by the following example.

EXAMPLE D

A field plot which had first been tilled, fertilized and treated with a mixture of commercial, pre-emergent herbicides is planted with corn of the Farmers Hybrid 4202 variety. Four weeks after planting, a portion of the corn plants in the field is treated with the compound of Example 6 at a rate of about 1 lb./acre. The chemical is applied in a solution containing equal parts by volume of acetone and water containing a small amount of Aerosol OT.

At maturity, the ears of corn from both treated and untreated plants are harvested, and a determination of dry weight is made. It is found that the corn plants treated with the test compound of this invention showed approximately 23% increase in yield by direct comparison with the control plants.

Compounds of this invention are also found to display herbicidal (plant killing) action with respect to various plant species. Such action is particularly noted in the case of preemergence treatment and is demonstrated in the following test.

EXAMPLE E

In an aluminum pan containing a good grade of top soil is planted a pre-determined number of each of a variety of seeds. An acetone solution of the chemical to be tested is prepared, and diluted with water to desired concentration. A separate supply of soil is then sprayed twice with the test solution at a total rate equivalent to approximately 5 lbs./acre, and the soil is thoroughly mixed after each application. That soil, with the chemical incorporated therein, is used to cover the planted seeds in the aluminum pan, which is then transferred to a greenhouse and watered from below. The pans are observed approximately 14 days after application, and the results on the various plant species are recorded.

In such tests, pre-emergent herbicidal activity was demonstrated against Canada thistle by the compounds of Examples 2, 5, 6, 8 and 9, against lambsquarter by the compounds of Examples 2 and 8, against smartweed by the compounds of Examples 2 and 5, against quackgrass by the compounds of Examples 5 and 6, against barnyard grass by the compounds of Examples 5 and 9, against Johnson grass by the compounds of Examples 6 and 10, and against downy brome by the compound of Example 10.

In terms of enzymatic inhibition, it is known that the commercial carbamate and organophosphate insecticides serve to inhibit cholinesterase activity. Compounds of this invention were tested for this purpose in the following manner.

EXAMPLE F

Approximately 2000 houseflies were homogenized in 300 mls. of cold distilled water. The homogenate was filtered through two layers of cheesecloth to remove large debris. The filtered homogenate was next centrifuged for 10 minutes at $12,000 \times g$. The pellet was discarded and the supernatant was again filtered through two layers of cheesecloth and centrifuged for 60 minutes at $105,000 \times g$. Following centrifuging the supernatant was poured off and discarded. The resultant pellet (microsomal fraction) was resuspended in a minimum volume of cold distilled water and frozen at $-10°$ C. for no longer than six weeks. Prior to use the frozen microsomal fraction was thawed and made up to 150 mls. with cold distilled water. The microsomes are then sonicated with a Bronson sonicator for 30 seconds to disperse the microsomes. Approximately 75% of the original cholinesterase actively present in the whole homogenate is recorded in the microsomal fraction.

Measurements of the inhibition of housefly cholinesterase are made on a Technicon Auto Analyzer essentially as described by G. D. Winter, *Ann, N.Y. Acad. Sci.*, vol. 87, pp. 875–882 (1960). A 90% inhibition of housefly cholinesterase is found using each of the compounds of Examples 1 and 9 at 10 p.p.m. concentration, and also with the compound of Example 10 at 20 p.p.m. concentration.

Compositions containing the compounds of this invention, including concentrates which require dilution prior to application, contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided solid, a liquid of organic origin, water, a wetting agent, a dispersing agent, an emulsifying agent or any suitable combination of these.

The compositions of this invention, particularly liquids and wettable powders, preferably contain as a conditioning agent one or more surface-active agents in amounts sufficient to render a given composition readily dispersible in water or in oil. The incorporation of a surface-active agent into the compositions greatly enhances their efficacy. By the term "surface-active agent" it is understood that wetting agents, dispersing agents, suspending agents and emulsifying agents are included therein. Anionic, cationic and non-ionic agents can be used with equal facility.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, ditertiary acetylenic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate. The wettable powders compositions of this invention usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total composition. Where required, from about 0.1 to 2.0 parts by weight of the solid inert extender can be replaced by a corrosion inhibitor or anti-foaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed, coverage is very uniform.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. The emulsifiable oil compositions generally contain from about 5 to 95 parts active ingredient, about 1 to 50 parts surface-active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface-active agent such as those listed hereinbefore can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the plant ragulant or phytotoxic granules.

The granular compositions of this invention generally contain from about 5 parts to about 30 parts by weight of active ingredient per 100 parts by weight of clay and 0 to about 5 parts by weight of surface-active agent per 100 parts by weight of particulate clay. The preferred granular compositions contain from about 10 parts to about 25 parts by weight of active ingredient per 100 parts by weight of clay.

When operating in accordance with the present invention, effective amounts of the regulants are applied to insects, plant parts or to the plant growing medium in any convenient fashion. The application of liquid and particulate solid compositions to above ground portions of plants can be carried out by conventional methods, e.g. power dusters, boom and hand sprayers and spray dusters. The compositions can also be applied from airplanes as a dust or a spray because of their effectiveness at low dosages. The application of these compositions to the plant growing medium is usually carried out by incorporating the compositions in the soil or other media in the area where the effect on the plants is desired.

The application of an effective plant regulant amount of the compounds of this invention to the plant is essential and critical to the practice thereof. The exact amount of active ingredient to be employed is dependent upon the response desired in the plant as well as other factors such as the plant species and stage of development thereof, and the amount of rainfall as well as the specific active applied. In foliar treatment for the modification of vegetative growth, the active ingredients are applied in amounts from about 0.01 to about 10 or more pounds per acre. In applications for increasing the maturation rate of plants including increasing the sugar content of plants, e.g. sugar cane, and facilitating the defoliation of plants, e.g. cotton and soybeans, the active ingredients are applied in amounts of at least 0.1 pound per acre. In applications for stimulating the growth of plants to obtain improved yield of plant products, the active ingredients are applied in amounts of 0.02 to 5.0 pounds per acre. Thus, the effective amount for each response can best be stated in terms of that response, e.g. a plant regulant amount for general modification, a tillering amount for tillering, an amount sufficient to increase the maturation rate for responses such as defoliation, increased sugar content and the like, a stature reducing amount for stature reduction and a desiccating amount for desiccation. It is believed that one skilled in the art can readily determine from the teachings of this specification, including examples, the appropriate application rate for particular purposes.

While the invention has been described herein with regard to certain specific embodiments, it is not so limited. It is to be understood that variations and modifications thereof may be made by those skilled in the art without departing from the spirit and scope of this invention.

What is claimed is:
1. A method of reducing the stature of plants which comprises treating said plants with a stature reducing amount of a compound of the formula

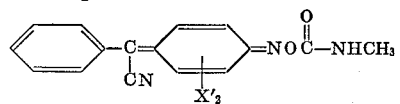

wherein each X' is independently chlorine or methyl.
2. A method as defined in Claim 1 wherein X'$_2$ is 2-chloro-5-methyl.
3. A method as defined in Claim 2 wherein the plants are corn plants.
4. A method as defined in Claim 1 wherein X'$_2$ is 2'-chloro-3-methyl.
5. A method as defined in Claim 1 wherein X'$_2$ is 2,5-dimethyl.

References Cited
UNITED STATES PATENTS
3,156,704  11/1964  Davis _____ 260—396

LEWIS GOTTS, Primary Examiner
C. L. MILLS, Assistant Examiner

U.S. Cl. X.R.
71—70, 105; 260—465 E; 424—304